(12) United States Patent
Holmberg (10) Patent No.: US 11,597,603 B2
(45) Date of Patent: Mar. 7, 2023

(54) ROTATING AND LOCKING CONVEYOR SIDE GUARD SYSTEM

(71) Applicant: Tim Holmberg, Credbard, SD (US)

(72) Inventor: Tim Holmberg, Credbard, SD (US)

(*) Notice: Subject to any disclaimer, the term of this patent is extended or adjusted under 35 U.S.C. 154(b) by 0 days.

(21) Appl. No.: 17/201,760

(22) Filed: Mar. 15, 2021

(65) Prior Publication Data
US 2021/0284455 A1    Sep. 16, 2021

Related U.S. Application Data

(60) Provisional application No. 62/989,548, filed on Mar. 13, 2020.

(51) Int. Cl.
*B65G 21/20* (2006.01)
*B65G 21/06* (2006.01)
*B65G 21/00* (2006.01)

(52) U.S. Cl.
CPC ......... *B65G 21/2072* (2013.01); *B65G 21/00* (2013.01); *B65G 21/06* (2013.01)

(58) Field of Classification Search
CPC ............ B65G 21/2072; B65G 21/2081; B65G 21/06; B65G 21/00
See application file for complete search history.

(56) References Cited

U.S. PATENT DOCUMENTS

| 4,650,067 A * | 3/1987 | Brule .................. B65G 21/2081 198/860.3 |
| 7,673,741 B2 * | 3/2010 | Nemedi .................. B65G 15/42 198/836.2 |
| 9,567,161 B2 * | 2/2017 | Holmberg .................. F16B 5/02 |
| 2006/0070859 A1 * | 4/2006 | Pahlow ................ B65G 47/266 198/860.1 |
| 2012/0018283 A1 * | 1/2012 | Dallner .................. B65G 21/08 198/804 |
| 2014/0116857 A1 * | 5/2014 | Zehr ...................... B65G 41/00 198/836.1 |
| 2017/0081125 A1 * | 3/2017 | DeGroot ................ B65G 15/62 |

* cited by examiner

*Primary Examiner* — Mark A Deuble
(74) *Attorney, Agent, or Firm* — Schmeiser, Olsen & Watts LLP (57) ABSTRACT

A rotating and locking conveyor side guard system may include an elongate side guard of sheet material having three longitudinal bolt slots therethrough, one at each end and one at the center, and three bolts for securing the side guard to a side of a conveyor through the bolt slots. With the bolts loosened, a user may slide the side guard from side to side, relative to the conveyor, and rotate the side guard about the center bolt to a substantially perpendicular orientation to allow access to an interior of the conveyor through the side of the conveyor. It may then be rotated in a second direction until the first and second bolt slots engage corresponding bolts, in a locked position, to prevent rotation of the side guard. Some systems may include multiple side guards end-to-end in series, each side guard sharing a bolt with each adjoining side guard.

9 Claims, 9 Drawing Sheets

ROTATING AND LOCKING CONVEYOR SIDE GUARD SYSTEM

CROSS REFERENCE TO RELATED APPLICATIONS

This application claims priority to U.S. Provisional Patent Application entitled "Rotating And Locking Conveyor Side Guard System," Ser. No. 62/989,548, filed Mar. 13, 2020, the disclosure of which is hereby incorporated entirely herein by reference.

BACKGROUND OF THE INVENTION

Technical Field

This invention relates generally to material handling conveyors and particularly to a rotating and locking conveyor side guard system.

State of the Art

Material handling conveyors are often equipped with side guards as a safety feature, such as to prevent injury to a person inserting a hand or arm through the side of a conveyor while in use. Side guards frequently require removal to allow intentional access to the interior of a conveyor, such as for maintenance. However, removal and installation of conventional side guards are cumbersome and time-consuming procedures, often requiring more than one person to perform.

Accordingly, what is needed is an improved conveyor side guard system.

SUMMARY OF THE INVENTION

The present invention relates to material handling conveyors and particularly to a rotating and locking conveyor side guard system.

A rotating and locking conveyor side guard system may comprise a side guard of a sheet material having three longitudinal bolt slots therethrough, wherein a first bolt slot is proximate a first end thereof, a second bolt slot is proximate a second end thereof, and a center bolt slot is proximate the center thereof. A side guard may be configured to be coupled to a side of a material handling conveyor by three bolts is inserted through the bolt slots. When the bolts are tightened, the side guard is prevented from moving relative to the conveyor. However, with the bolts loosened, a user may slide the side guard from side to side, relative to the conveyor, wherein the extents of side-to-side motion are limited by the bolts engaging the bolt slots.

In embodiments, a side guard comprised a hooked portion proximate the first bolt slot and the second bolt slot are open, wherein, with the bolts loosened, the side guard is configured to be rotated about the center bolt to a substantially perpendicular orientation relative to the conveyor to allow uninhibited access to an interior portion of the conveyor through the side of the conveyor.

The side guard is configured to be rotated in a second direction until the first and second bolt slots engage corresponding bolts, whereupon the user may slide the side guard to a locked position, wherein first and second bolts are locked within the corresponding first and second bolt slots to prevent rotation of the side guard. The side guard may be secured to the conveyor by tightening the bolts.

In some embodiments, one end of a side guard may be specially shaped to conform to a special shape of a conveyor. In some embodiments, a side guard may comprise at least on aperture therethrough through which a user may view the interior portion of a conveyor. In some embodiments, a side guard may be configured to be coupled above a top rail of a conveyor.

In some embodiments, a rotating and locking conveyor side guard system may comprise a plurality of side guards disposed end-to-end in a series along a side of a conveyor. In such embodiments, the bolts proximate the ends thereof may be shared between adjoining side guards.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

As discussed above, embodiments of the present invention relate to material handling conveyors and particularly to a rotating and locking conveyor side guard system.

Figure 1:
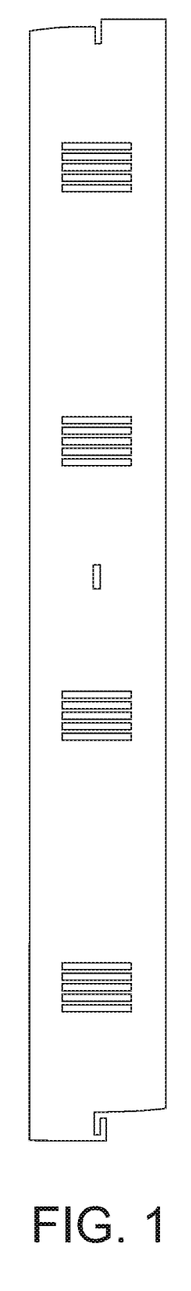
FIG. 1 is a front view of a side guard of a rotating and locking conveyor side guard system, according to an embodiment.

Referring to the drawings, as shown in FIG. 1, a rotating and locking conveyor side guard system may comprise a side guard 10, wherein side guard 10 may be a single unitary member formed of a sheet material, such as a sheet metal, for example. In some embodiments, side guard 10 may be elongate and substantially rectangular having: a width shorter than its length, a top edge 12 opposite a bottom edge 14, and a first end 16 opposite a second end 18. Side guard 10 may further comprise three longitudinal bolt slots therethrough, including a first bolt slot 20 proximate the first end 16 thereof, a second bolt slot 22 proximate the second end 18 thereof, and a center bolt slot 24 proximate a center thereof, wherein each of the three longitudinal bolt slots has a longitudinal centerline that is colinear with a longitudinal centerline of the side guard midway between the top edge and the bottom edge thereof.

Figure 6A:
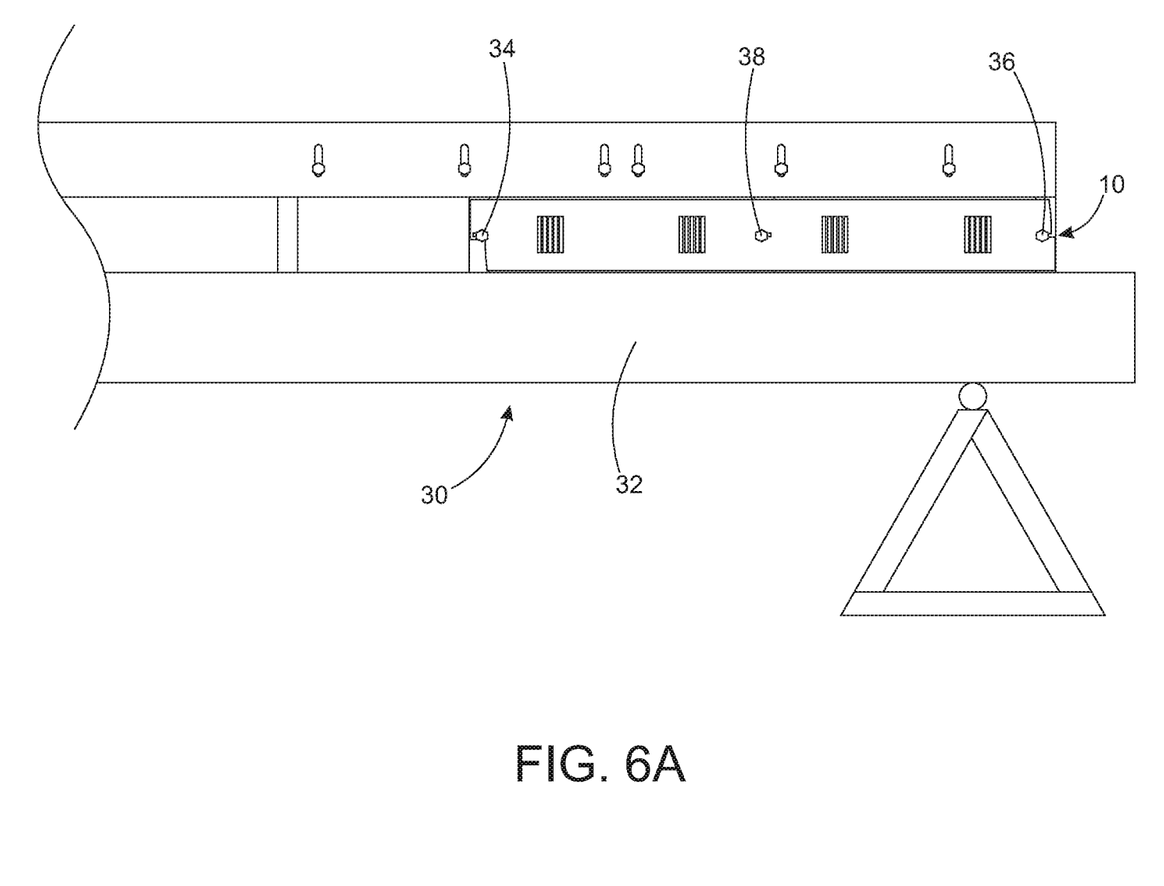
FIG. 6A is a side view of a rotating and locking conveyor side guard system coupled to a material handling conveyor, according to an embodiment.
Figure 6B:
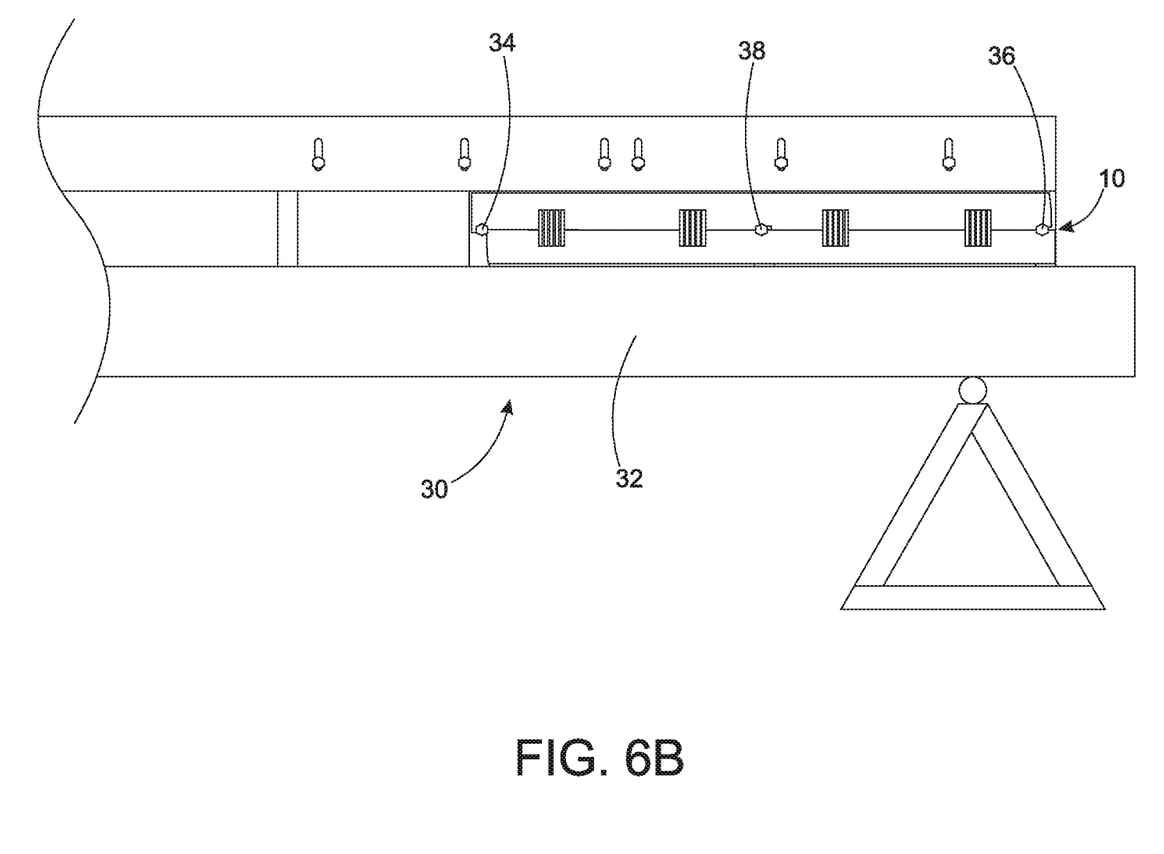
FIG. 6B is another side view of a rotating and locking conveyor side guard system coupled to a material handling conveyor, according to an embodiment.

As shown in FIG. 6, side guard 10 may be configured to be coupled to a side 32 of a material handling conveyor 30, wherein side guard 10 may be bolted to the conveyor by three bolts 34, 36, 38 of the system, wherein each of the three bolts 34, 36, 38 is inserted through one of the three bolt slots 20, 22, 24, respectively, and threaded into corresponding threaded apertures (not shown) in side 32 of conveyor 30, wherein first bolt 34 is inserted through first bolt slot 20 into a first threaded aperture, second bolt 36 is inserted through second bolt slot 22 into a second threaded aperture, and center bolt 38 is inserted through center bolt slot 24 into a center threaded aperture. When the bolts are tightened, side guard 10 is prevented from moving relative to the conveyor. However, with the bolts loosened, a user may slide side guard 10 from side to side, relative to the conveyor, wherein the extents of side-to-side motion are limited by the bolts engaging the bolt slots. For example, a user may slide side guard 10 to the left until the right sides of the bolts engage the corresponding right interior edges of the bolt slots. The user may slide side guard 10 to the right until the left sides of the bolts engage the corresponding left interior edges of the bolt slots.

Figure 3:
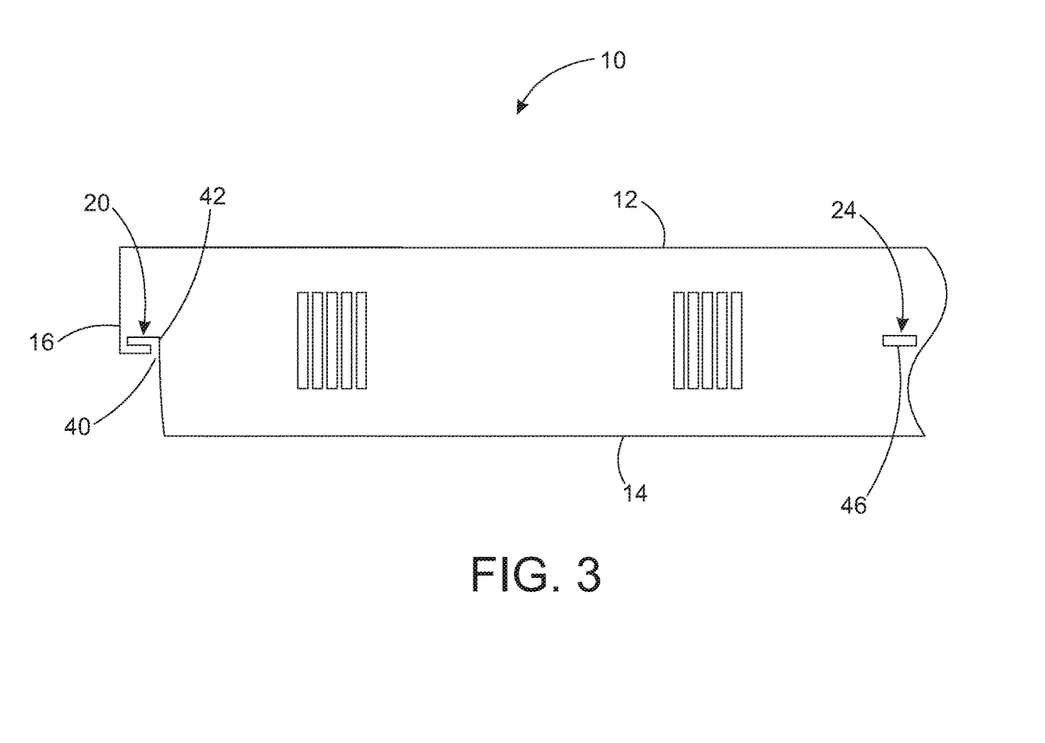
FIG. 3 is a front view of a first end of a side guard of a rotating and locking conveyor side guard system, according to an embodiment.
Figure 5:
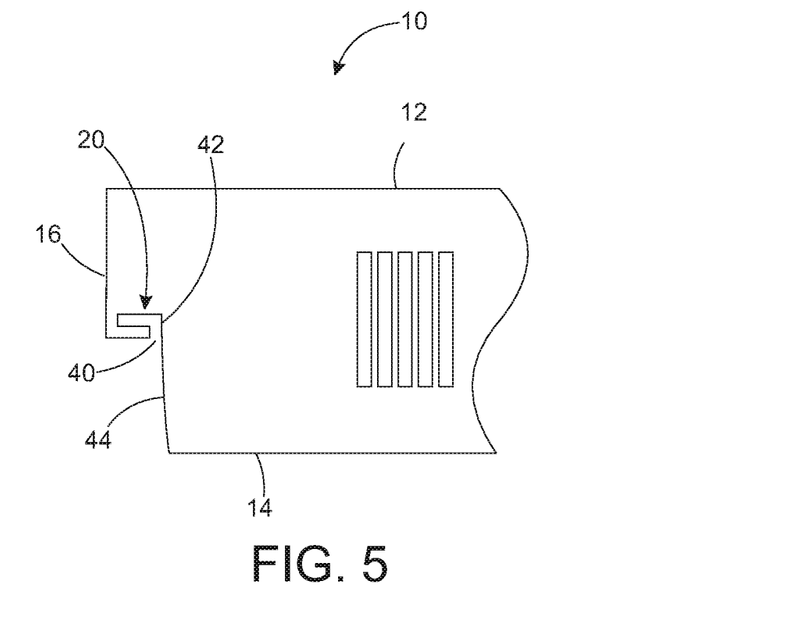
FIG. 5 is a close-up view of a first end of a side guard of a rotating and locking conveyor side guard system, according to an embodiment.

As shown in FIGS. 3 and 5, in embodiments of the system, first end 16 of side guard 10 may comprise a first opening 40 extending from an inner end 42 of first bolt slot 20 to the most proximate edge, bottom edge 14 of side guard 10. The first opening 40 may be curved, wherein an inner edge 44 of first opening 40 corresponds to a radius centered at a midpoint of a distal inner edge 46 of center bolt slot 24. In some embodiments, first opening 40 may be a curved slot having a width corresponding to a width of first bolt slot 20. In some embodiments, a corner portion 54 of side guard 10, between first opening 40 and first end 16 of side guard 10 may be removed, wherein a hooked portion is formed between the first bolt slot and the removed corner portion (not shown).

Figure 2:
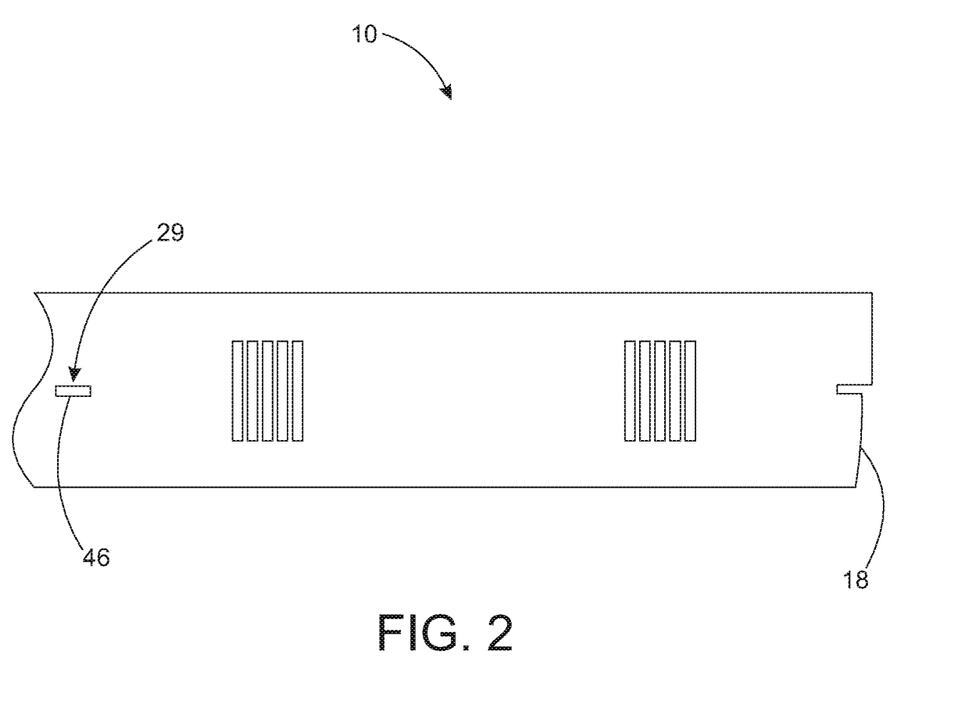
FIG. 2 is a front view of a second end of side guard of a rotating and locking conveyor side guard system, according to an embodiment.
Figure 4:
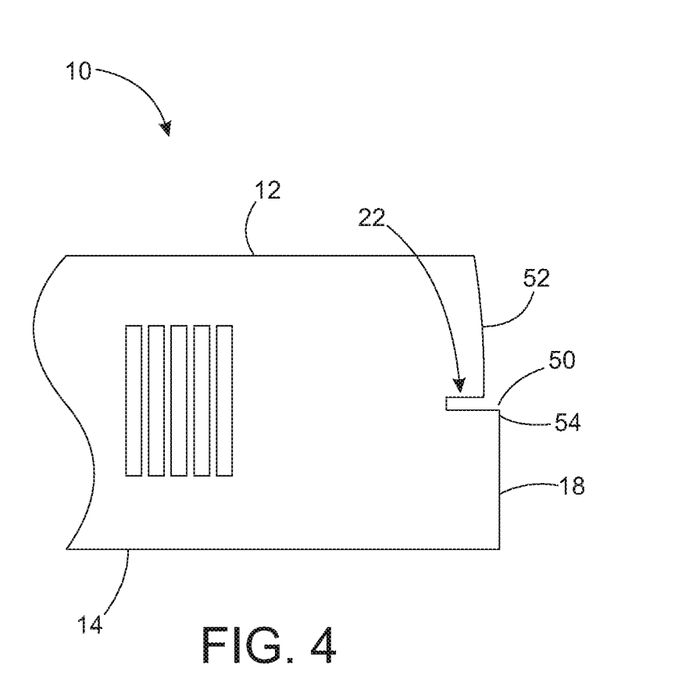
FIG. 4 is a close-up view of a second end of a side guard of a rotating and locking conveyor side guard system, according to an embodiment.

As shown in FIGS. 2 and 4, in embodiments of the system, second end 18 of side guard 10 may comprise a second opening 50 extending inwardly from second end 18 to form second bolt slot 22. For example, if first opening 40 extends to bottom edge 14, then second opening 50 extends to top edge 12. If first opening 40 extends to top edge 12, then second opening 50 extends to bottom edge 14. The second opening 50 may also be curved, wherein an inner edge 52 of second opening 50 corresponds to a radius centered at the midpoint of the proximate inner edge 46 of center bolt slot 24. In some embodiments, second opening 50 may be a curved slot having a width corresponding to a width of second bolt slot 22. The corner portion 54 of side guard 10, between second opening 50 and second end 18 of side guard 10 is necessarily removed.

Referring to FIGS. 6A-6B, with the bolts loosened, a user may slide the side guard, relative to the conveyor, to a first configuration, wherein each of the first and second bolts engages an edge of the respective first and second bolt slots opposite the corresponding first and second openings. In the first configuration, shown in FIG. 6B, the side guard is prevented from rotating relative to the conveyor because each of the first and second bolts is restrained by the corresponding first and second bolt slots, thereby locking the side guard. A user may slide the side guard, relative to the conveyor, to a second configuration, wherein each of the first and second bolts engages an edge of the respective first and second bolt slots on the same ends thereof as the corresponding first and second opening. From the second configuration, as shown in FIG. 6A a user may rotate the side guard in a first direction, relative to the conveyor, because the first bolt is free to travel through the first opening, and the second bolt is free to travel through the second opening, wherein the entire side guard is rotated in the first direction about the center bolt. As shown in FIG. 6A, the side guard 10 may be rotated in the first direction, for example, until the side guard is disposed substantially perpendicular to the conveyor. With the side guard disposed substantially perpendicular to the conveyor, the user may access an interior portion of the conveyor through a now unobstructed side of the conveyor, such as for performance of maintenance procedures, and the like.

The user may secure the side guard to the side of the conveyor again by rotating the side guard in a second direction until the first and second bolts engage the first and second bolt slots again, respectively, in the second configuration. The user may then slide the side guard to the first configuration and tighten the three bolts.

With the bolts loosened, the user may rotate the side guard, relative to the conveyor, without the need to completely remove the bolts. This is advantageous, in that the bolts are not likely to be dropped or lost and rotating the side guard to provide access through the side of the conveyor, such as for maintenance procedures, may be performed simply by a single person alone.

Figure 7:
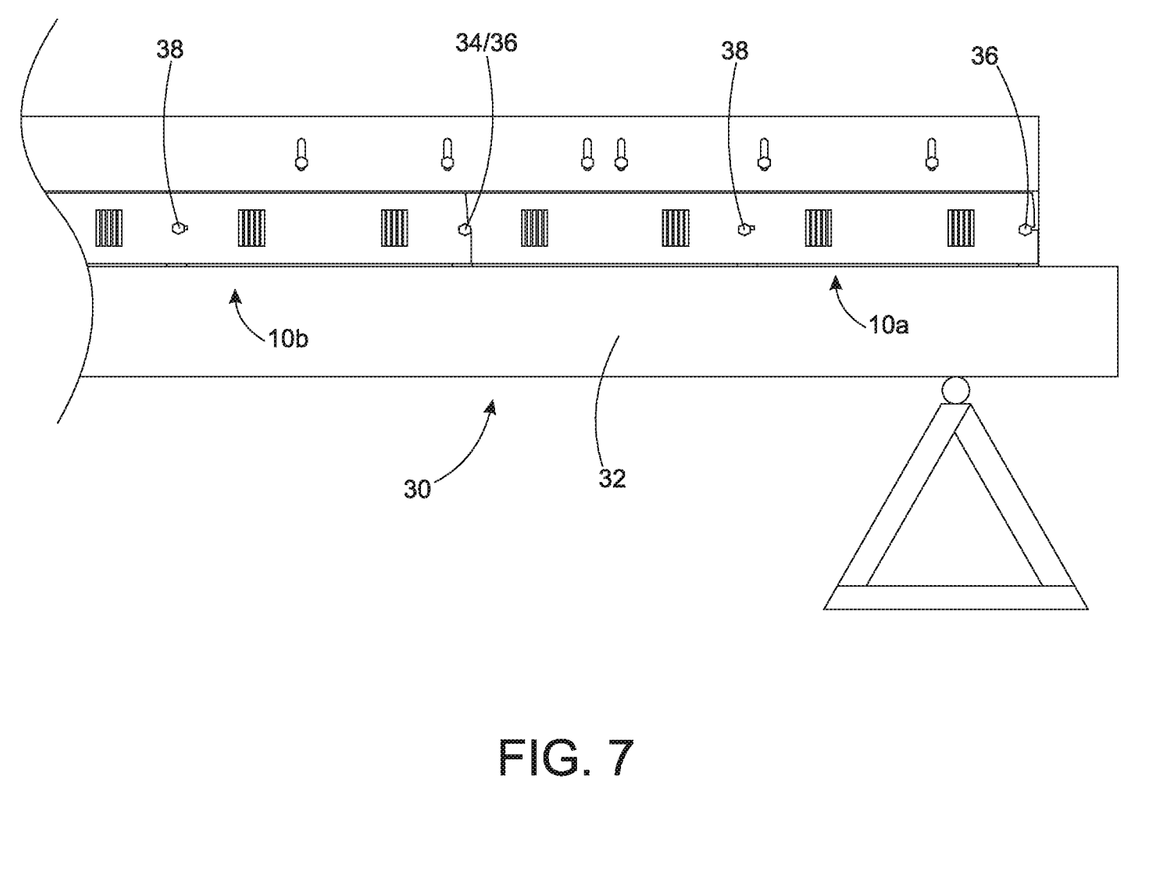
FIG. 7 is a close-up side view of a plurality of side guards of a rotating and locking conveyor side guard system, according to an embodiment.

As shown in FIG. 7, in some embodiments, a rotating and locking conveyor side guard system may comprise a plurality of side guards 10, wherein each of the plurality of side guards 10 (such as first side guard 10a and second side guard 10b) may be mounted to a side of a conveyor end-to-end in series, wherein a first bolt 34 corresponding to and inserted through a first bolt slot 20 of first side guard 10a may also be inserted through a second bolt slot 22 of a second side guard 10b adjacent first side guard 10a. In such embodiments, any of a first or second bolt 34/36 may be shared by any two adjacent side guards 10, wherein a first end 16 of a first side guard 10a may overlap a second end 18 of an adjacent second side guard 10b, and so on through the series of side guards 10.

Figure 8:
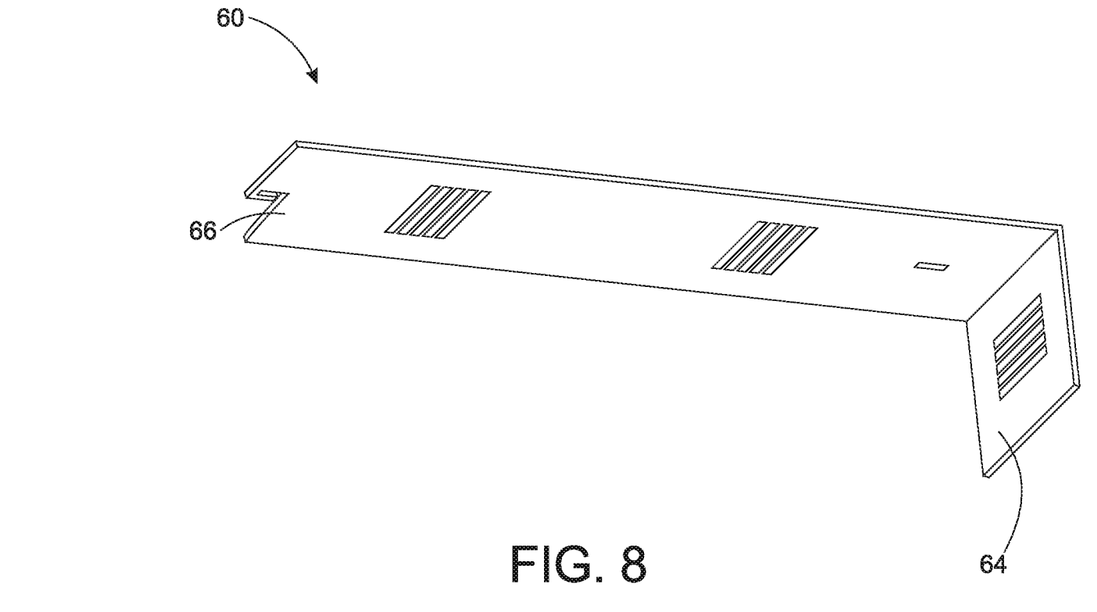
FIG. 8 is a perspective view of a rotating and locking conveyor side guard system, according to an alternative embodiment.

As shown in FIG. 8, in some embodiments, a side guard 60 may comprise a first end 66, but no second end. In such embodiments, a specially shaped portion 64 of side guard 60 opposite first end 66 may be bent or shaped into a configuration to conform to a shape of the conveyor. In such embodiments, specially shaped portion 64 may be bolted to the conveyor, such as by a special bolt 66 through a special bolt hole. In such embodiments, specially shaped portion 64 may be unbolted, and a first bolt 34 and a center bolt 38 simply loosened, without completely removing the first and center bolts, 34 and 38, thus allowing side guard 60 to be rotated about the center bolt to provide access to the interior of the conveyor in substantially the same manner as described above, with the exception that there is no second bolt and corresponding second bolt slot as described above.

In some embodiments, a side guard may be configured for mounting along a top rail of the conveyor (not shown). In such embodiments, each of the first, second, and center bolts may be coupled to a first, second, and center bracket, respectively, wherein each of the first, second, and center brackets is coupled to the top rail of the conveyor. In operation, of such embodiments, the side guard may be rotated in the same manner as described above to allow unrestricted access to the top of the conveyor, for example.

As shown in FIG. 1, in some embodiments, side guard 10 may comprise at least one aperture or a plurality of grilled openings 11 therethrough through which a user may view the interior portion of the conveyor. The at least one aperture or plurality of grilled openings 11 may also be a gripping point for the user to grip side guard 10, such as for rotating the side guard.

Although embodiments of rotating and locking conveyor side guard system, as described above, may comprise a first, second, and center bolt, this is not intended to be limiting. It is contemplated that a system may comprise screws or pins in place of bolts, or a system may comprise any other similar mounting hardware consistent with the intended use of bolts in the system, provided the mounting hardware provides for the side guard to be rotated with respect to the conveyor in the manner described above, and for the side guard to be secured to the conveyor.

The precise shape of a side guard of the present invention, as described above and in the drawings, is not intended to be limiting. It is contemplated that a side guard may be of any of a variety of shapes, so long as such shape is consistent with the functionality of a side guard as described herein. As an example, without limitation, a side guard may have rounded corners or square corners.

Further, it will be understood that side guard may be formed on a larger scale or larger panel sizes on any other form of cage type guarding for equipment or safety pertaining to any industry where a customer requires routine close contact with quick accessibility where space isn't available to have an entry door and internal pathway for easy walk through type access.

The components defining any rotating and locking conveyor side guard system may be formed of any of many different types of materials or combinations thereof that can readily be formed into shaped objects provided that the components selected are consistent with the intended operation of a rotating and locking conveyor side guard system. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any rotating and locking conveyor side guard system may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A method of coupling a side guard to a side of a material handling conveyor comprising:
   inserting a first bolt through a first bolt slot of the sideguard into a first threaded aperture of a side of the conveyor;
   inserting a second bolt through a second bolt slot of the sideguard into a second threaded aperture of the side of the conveyor;
   inserting a center bolt through a center bolt slot of the sideguard into a center threaded aperture of the side of the conveyor; and
   loosening the first, second and center bolts and rotating the side guard relative to the conveyor, wherein the first, second and center bolts are not completely removed.

2. The method of claim 1, further comprising tightening the first, second and center bolts, whereby the side guard is prevented from moving relative to the conveyor.

3. The method of claim 1, wherein the side guard comprises a center, a top edge opposite a bottom edge, and a first end opposite a second end, and wherein the first bolt slot is proximate the first end thereof, the second bolt slot is proximate the second end thereof, and the center bolt slot is proximate the center thereof.

4. The method of claim 3, wherein the side guard further comprises a first opening extending from an inner end of the first bolt slot to the bottom edge of the side guard and a second opening extending inwardly from the second end of the side guard to form the second bolt slot.

5. The method of claim 4, further comprising loosening the first, second and center bolts and sliding the side guard, relative to the conveyor, to a first configuration, wherein each of the first and second bolts engages an edge of the respective first and second bolt slots opposite the corresponding first and second openings.

6. The method of claim 5, further comprising sliding the side guard, relative to the conveyor, to a second configuration, wherein each of the first and second bolts engages an edge of the respective first and second bolt slots on the same ends thereof as the corresponding first and second opening.

7. The method of claim 6, wherein from the second configuration, rotating the side guard in a first direction, relative to the conveyor.

8. The method of claim 7, further comprising securing the side guard to the side of the conveyor again by rotating the side guard in a second direction until the first and second bolts engage the first and second bolt slots again, respectively, in the second configuration.

9. The method of claim 8, further comprising sliding the side guard to the first configuration and tightening the first, second and center three bolts.

\* \* \* \* \*